United States Patent
Hanawa et al.

(10) Patent No.: US 12,253,123 B1
(45) Date of Patent: Mar. 18, 2025

(54) CAM CLUTCH

(71) Applicant: TSUBAKIMOTO CHAIN CO., Osaka (JP)

(72) Inventors: Yuto Hanawa, Osaka (JP); Masahiro Kobayashi, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/817,951

(22) Filed: Aug. 28, 2024

(30) Foreign Application Priority Data

Sep. 19, 2023 (JP) .................... 2023-151343

(51) Int. Cl.
  *F16D 41/07* (2006.01)
  *F16D 41/06* (2006.01)

(52) U.S. Cl.
  CPC ...... *F16D 41/07* (2013.01); *F16D 2041/0605* (2013.01)

(58) Field of Classification Search
  CPC ............ F16D 2041/0605; F16D 41/06; F16D 41/069; F16D 41/07
  See application file for complete search history.

(56) References Cited

U.S. PATENT DOCUMENTS

| | | | |
|---|---|---|---|
| 2004/0074730 A1* | 4/2004 | Miura | F16D 41/07 192/45.1 |
| 2006/0118379 A1* | 6/2006 | Miura | F16D 41/069 192/45.1 |
| 2023/0068029 A1* | 3/2023 | Kusunoki | F16D 41/07 |

FOREIGN PATENT DOCUMENTS

| | | |
|---|---|---|
| JP | 2015-152138 A | 8/2015 |
| WO | 2015/125618 A1 | 8/2015 |

* cited by examiner

*Primary Examiner* — Timothy Hannon
(74) *Attorney, Agent, or Firm* — WHDA, LLP

(57) ABSTRACT

An object of the present invention is to provide a cam clutch that biases cams with a stable force and enables improvement in durability and operational stability. The biasing means for biasing the cams to contact the inner race and outer race is formed by a ribbon spring, with a base part shaped into a ring and having cam-receiving portions and cam-biasing portions. The ribbon spring has an end structure configured to allow both ends of the base part to push each other in a circumferential direction. The end structure is configured to include a contact portion that extends in a radial direction and makes surface-contact with any of the inner race, the outer race, and the cage ring that holds the cams.

6 Claims, 6 Drawing Sheets

CAM CLUTCH

BACKGROUND OF THE INVENTION

1. Field of the Invention

The present invention relates to a cam clutch having a ribbon spring.

2. Description of the Related Art

A cam clutch is primarily composed of a plurality of cams arranged between an inner race and an outer race, a retainer retaining the plurality of cams, and a biasing means biasing each of the cams in a direction in which the cams engage with the inner race and outer race. The plurality of cams are engaged with and separated from the inner race and outer race in accordance with relative movements between the inner race and the outer race, thereby allowing transmission and interruption of torque from a drive side to a driven side.

For example, Japanese Patent Application Publication No. 2015-152138 discloses a sprag one-way clutch that uses an annular ribbon spring as a biasing means. This ribbon spring has an elongated member which is formed with a plurality of sprag-receiving holes and sprag-biasing tongues arranged along the longitudinal direction, and which id rounded into a ring shape. The sprag-receiving hole, which is located nearest to one longitudinal end, overlaps the sprag-receiving hole adjacent the edge of the other longitudinal end, and this other longitudinal end is positioned on the radially outer side and in contact with the retainer.

SUMMARY OF THE INVENTION

Generally, it is desirable that the ribbon spring maintain a shape of a true circle in order to bias each of the plurality of cams with an appropriate force.

In the case with the ribbon spring described above, the shape is maintained by the edge of the other longitudinal end on the radially outer side making contact with the retainer. This configuration may sometimes cause the ribbon spring to be partly linear, changing the ribbon spring circumference. Because of this, not all of the sprags may necessarily be contacted by the tongues in the correct positions, and some of the tongues may even fail to bias the sprags. In particular, the sprag held in the sprag-receiving hole closest to one end and the sprag held in the sprag-receiving hole closest to the other end of the elongated member tend to receive an unstable biasing force, and in some cases these sprags may not properly engage the inner and outer races.

One possible solution to this problem, which is to increase the length of the tongues in order to load the sprags with an appropriate biasing force, will increase the stress and compromise durability.

Such a ribbon spring can easily cause varying loads on the cams when used in a selectable clutch that is switchable between operating modes. The varying loads can cause problems such as an increased drive force required to switch operating modes, and switching failures due to stuck cams caused by the tongues making contact in wrong positions.

The present invention has been made on the basis of the circumstances described above, and it is an object of the invention to provide a cam clutch that bias cams with a stably force and enables improvement in durability and operational stability.

The present invention achieves the above object by providing a cam clutch including: an inner race and an outer race coaxially disposed and rotatable relative to each other; a plurality of cams arranged between the inner race and the outer race; a cage ring holding the cams in a circumferential direction; and a biasing means biasing the cams to make contact with the inner race and the outer race, the biasing means being a ribbon spring including a base part shaped into a ring and having cam-receiving portions and cam-biasing portions that bias the cams fitted in the cam-receiving portions, the biasing means having an end structure configured to allow both ends of the base part to push each other in a circumferential direction, and the end structure including a contact portion that extends in a radial direction and makes surface-contact with any of the inner race, the outer race, and the cage ring.

The invention according to claim 1 allows the biasing means to maintain an intended shape by reducing circumferential and radial elastic deformations, so that displacement at the positions where the cam-biasing portions contact the cams, and variations in the biasing force on the cams, can be prevented. All the cams can therefore be loaded with an appropriate biasing force, which improves the operational stability of the cam clutch.

The cam-biasing portions for biasing the cams held in the cam-receiving portions closest to one end and the other end of the base part do not have to be increased in length or thickness to increase their spring load. This improves the durability of the biasing means, and helps extend the service life, as well as enables cost-effective production of desirable biasing means.

In the case where the cam clutch is configured as a selectable clutch, the drive force required to switch operating modes can be reduced, allowing a reduction in size and cost of the switch driving mechanism. The ability to load all the cams in a uniform orientation makes it easier to design selectable clutches and other variations that require cam orientation control.

According to the invention set forth in claim 2, the bent portions provided axially adjacent the cam-biasing portions enhance the rigidity, so that displacement at the positions where the cam-biasing portions contact the cams, and variations in the biasing force on the cams, can be prevented even more reliably.

According to the invention set forth in claim 3, the shape stability of the biasing means can be ensured by forming the bent portions so as to be able to contact any of the inner race, outer race, and cage ring.

According to the invention set forth in claims 4 to 6, an end structure that allows an appropriate biasing force to be applied to all the cams can be formed, to ensure that the intended effect will be achieved.

In particular, the end structure according to claim 5 allows easy production and resolves the issue of inaccuracies involved in bending processes, as the end structure can be formed as desired only by a punching process, without the need to perform a bending process to both ends of the base part.

DESCRIPTION OF THE PREFERRED EMBODIMENTS

Hereinafter, embodiments of the present invention will be described with reference to the drawings.

Figure 1:
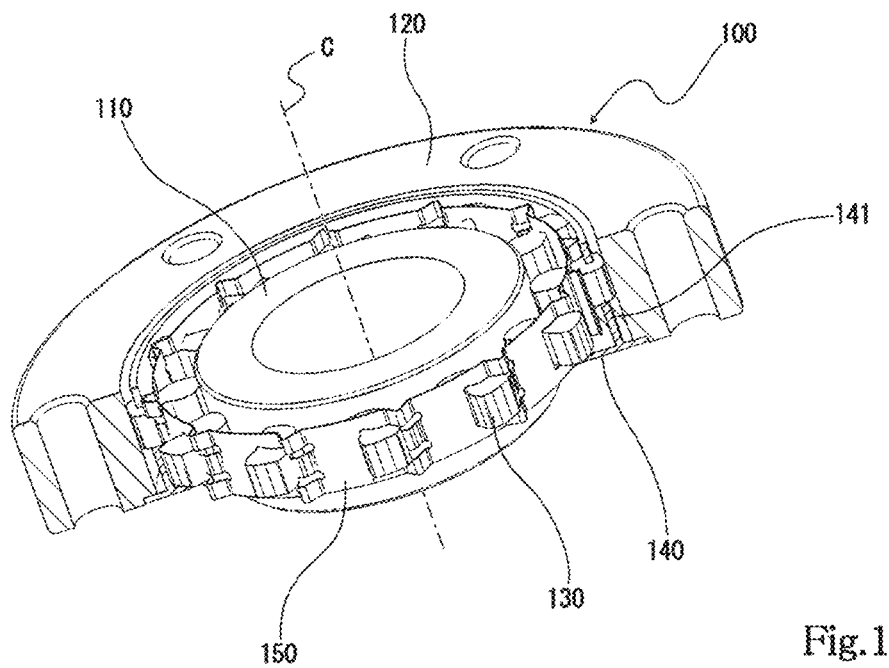
FIG. 1 is a partially broken perspective view illustrating the configuration of a cam clutch according to one embodiment of the present invention.
Figure 2:
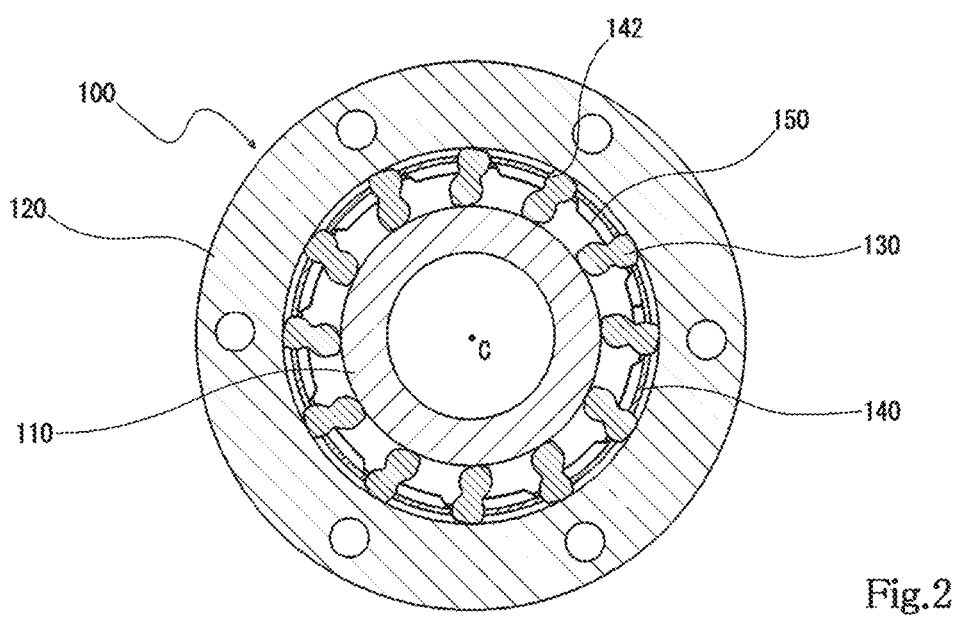
FIG. 2 is a cross-sectional view perpendicular to the rotation axis of the cam clutch configuration shown in FIG. 1.

As shown in FIG. 1 and FIG. 2, the cam clutch 100 according to the present invention includes an inner race 110 and an outer race 120 coaxial and rotatable relative to each other, a plurality of cams 130 circumferentially spaced apart in an annular space between the inner race 110 and the outer race 120, a cage ring 140 coaxially disposed and rotatable with the outer race 120 between the inner race 110 and the outer race 120 and holding each of the plurality of cams 130, and a biasing means 150 that biases each of the plurality of cams 130 in an engaging direction to bring the cams into contact with the inner race 110 and the outer race 120. Reference symbol C in FIG. 1 and FIG. 2 denotes the rotation axis.

Figure 4:
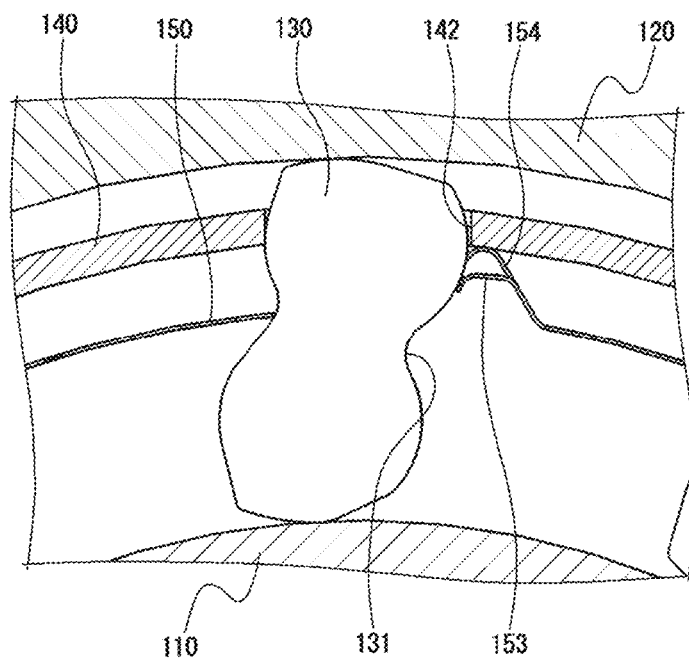
FIG. 4 is a schematic cross-sectional view illustrating a cam-biasing portion and a cam in contact with each other.

The cams 130 have a substantially figure-eight shape, with a constricted part 131 in the middle in the radial direction (see FIG. 4). The cams 130 in this embodiment are configured to engage the inner race 110 and outer race 120 when the inner race 110 is rotated in the forward direction (clockwise in FIG. 2), or when the outer race 120 is rotated in the reverse direction (counterclockwise in FIG. 2).

While this embodiment shows the plurality of cams 130 equally spaced apart in the circumferential direction as one example, the arrangement of the cams 130 is not limited to this and they may not necessarily be equally distanced in the circumferential direction.

The cage ring 140 includes an axially extending cylindrical main body 141. The main body 141 includes circumferentially arranged cam-holding portions 142.

In this embodiment, the cage ring 140 is rotatable with the outer race 120, with the main body 141 being positioned on the radially outer side, and is configured to hold the cams 130 by receiving the head parts of the cams 130, which are on the radially outer side of the constricted parts 131. Alternatively, the cage ring 140 may be configured to have the main body 141 positioned on the radially inner side, and to hold the cams 130 by receiving the leg parts of the cams 130, which are on the radially inner side of the constricted parts 131.

The biasing means 150 is a ribbon spring. In this embodiment, the biasing means 150 is arranged between the inner race 110 and the cage ring 140.

Figure 3:
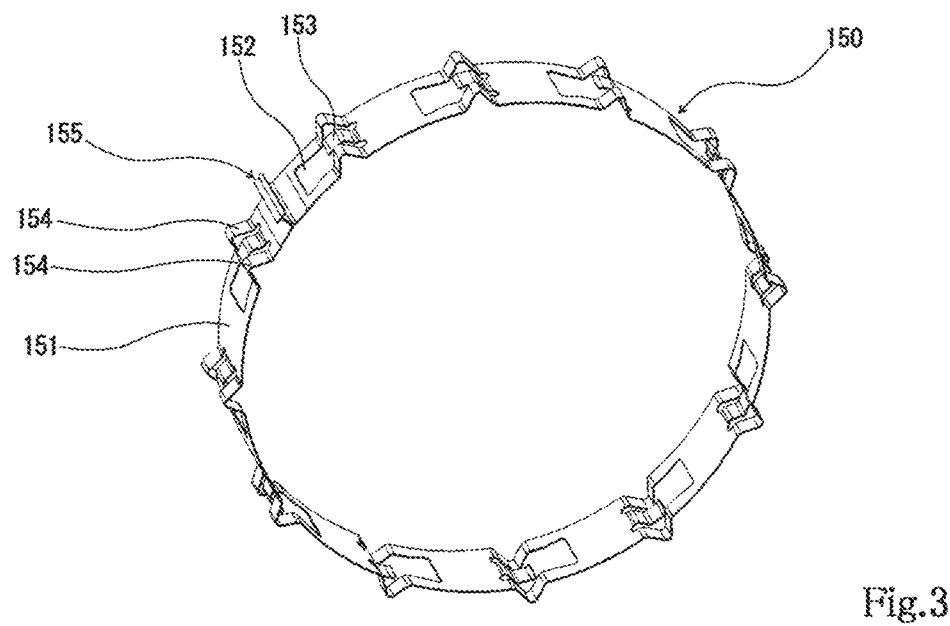
FIG. 3 is a perspective view illustrating a configuration of a biasing means.

As shown in FIG. 3, for example, the ribbon spring in this embodiment is a thin band-like metal base part 151 shaped into a ring and having cam-receiving portions 152 and cam-biasing portions 153 that bias the cams 130 fitted in the cam-receiving portions 152.

The cam-receiving portions 152 are formed as holes with a rectangular shape, for example. The cam-biasing portions 153 are formed by tabs in the shape of a plate spring extending into the cam-receiving portions 152 from one edge defining the cam-receiving portion 152 on one longitudinal end. The cam-receiving portions 152 and the tabs that form the cam-biasing portions 153 can be formed by punching, for example. The cam-biasing portions 153 can be formed by bending the tabs.

The cam-biasing portion 153 is configured to contact one side face of the head part of the cam 130 that is fitted in the cam-receiving portion 152, to bias the cam 130 in an engaging direction, as shown in FIG. 4.

Bent portions 154 protrude radially outward from both edges that define the cam-receiving portions 152 of the base part 151, axially adjacent each cam-biasing portion 153. In this embodiment, the bent portions 154 are formed such as to be able to contact an inner circumferential surface of the cage ring 140, for example.

The bent portions 154 do not necessarily have to be able to contact the inner circumferential surface of the cage ring 140, and they can be protruded radially inward. In an alternative configuration where the cage ring 140 holds the cams 130 by receiving the leg parts of the cams 130, and the biasing means 150 is disposed between the outer race 120 and the cage ring 140, the bent portions 154 may be protruded radially inward to be able to contact an outer circumferential surface of the cage ring 140, or may be protruded radially outward to be able to contact an inner circumferential surface of the outer race 120.

The biasing means 150 in the cam clutch 100 described above includes an end structure 155 configured to allow both ends of the base part 151 to push each other in a circumferential direction.

Figure 5:
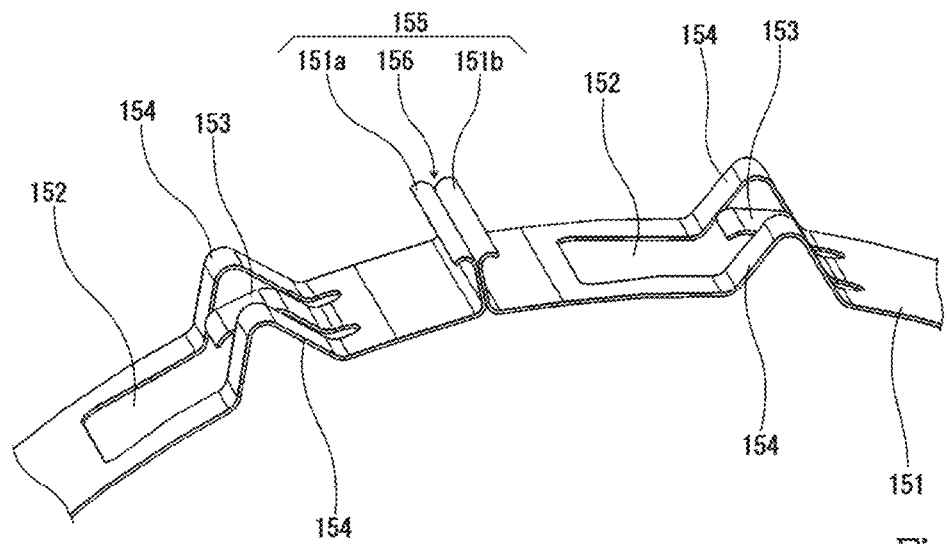
FIG. 5 is a schematic perspective view illustrating an end structure of the biasing means.

In this embodiment, as shown in FIG. 5, one end 151a and the other end 151b of the base part 151 are bent in the same radial direction, with their ends curved in a circular arc. The ends of the base part 151 abutting each other in the circumferential direction thus form the end structure 155, which extends in the radial direction and includes a contact portion 156 making surface-contact with the cage ring 140.

Figure 6:
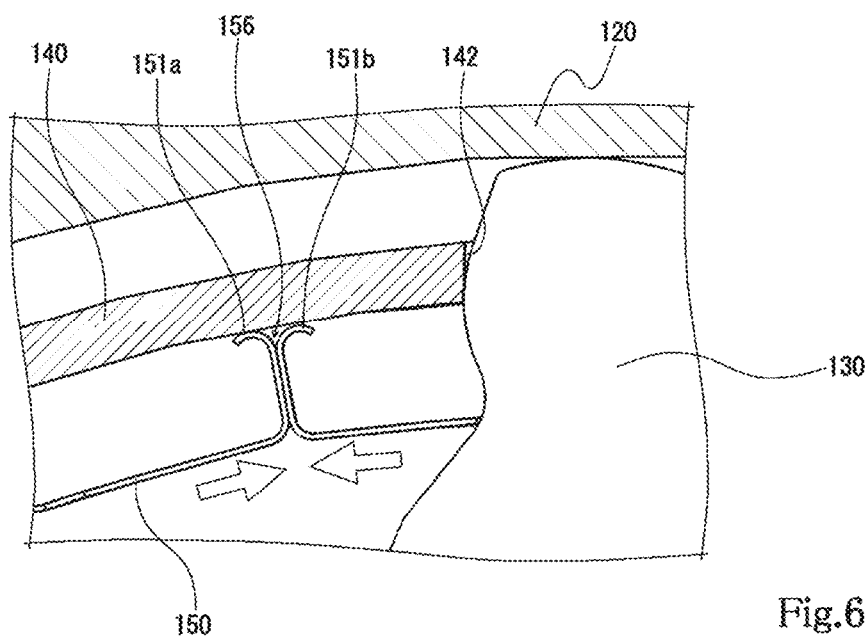
FIG. 6 is a schematic diagram for explaining the effect of the end structure of the biasing means.

The end structure 155 of the biasing means 150 provides the following effects: As shown in FIG. 6, one end 151a and the other end 151b of the base part 151 pushing each other in the circumferential direction restrict the circumferential movements of the biasing means 150 relative to the cams 130. At the same time, the contact portion 156 making surface-contact with the cage ring 140 radially constrains the biasing means 150. This reduces circumferential and radial elastic deformations of the biasing means 150 and enables the biasing means to maintain its intended shape. Thus displacement at the positions where the cam-biasing portions 153 contact the cams 130, and variations in the biasing force on the cams 130, can be prevented. In particular, instability in the biasing force on the cams 130 fitted in the cam-receiving portions 152 closest to one end and the other end of the base part 151 can be reliably prevented. All the cams 130 can therefore be loaded with an appropriate biasing force in the cam clutch 100 described above, which improves the operational stability of the cam clutch 100.

The improved shape stability of the biasing means 150 and uniform application of an appropriate biasing force on all the cams 130 obviate the need to increase the length or thickness of the cam-biasing portions 153 to increase the spring load for loading specific cams 130, for example, the cams 130 held in the cam-receiving portions 152 closest to one end and the other end of the base part 151. This can improve the durability of the biasing means 150, and help extend its service life, as well as enables cost-effective production of desirable biasing means 150.

Figure 7:
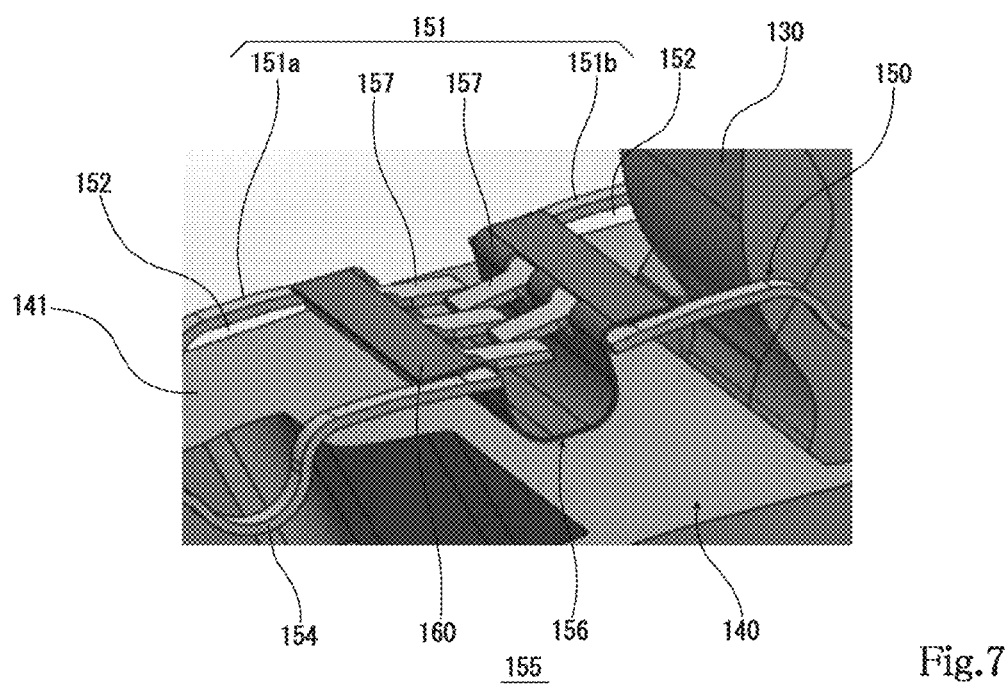
FIG. 7 is a schematic diagram illustrating an end structure of the biasing means in a cam clutch according to another embodiment of the present invention.
Figure 9:
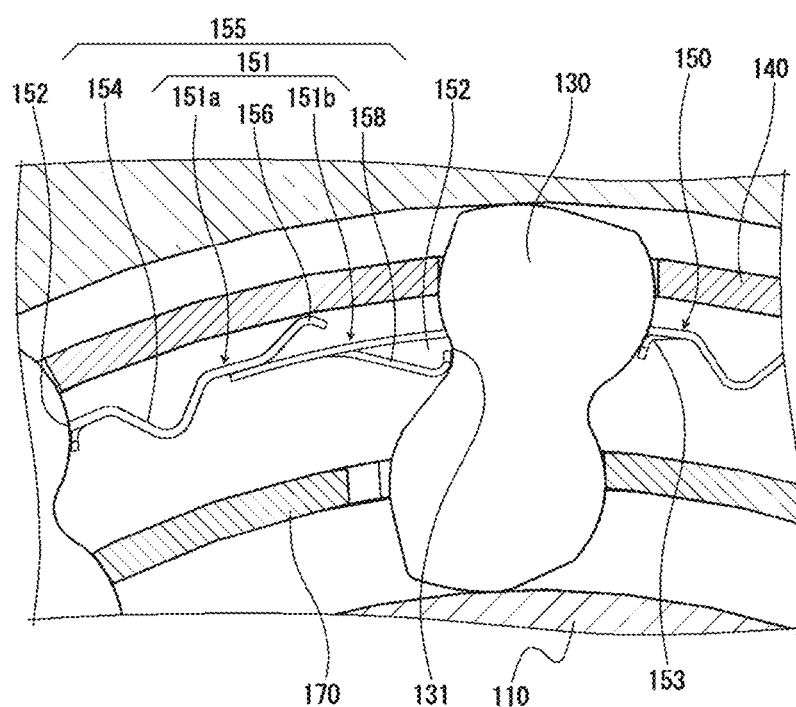
FIG. 9 is a schematic diagram illustrating an end structure of the biasing means in a cam clutch according to yet another embodiment of the present invention.

The end structure 155 of the biasing means 150 in the cam clutch 100 of the present invention is not limited to the design described above. FIG. 7 and FIG. 9 show alternative configurations for example.

The end structure 155 of the biasing means 150 shown in FIG. 7 uses a resilient member 160 that connects one end 151a and the other end 151b of the base part 151. The resilient member 160 is formed such as to be able to contact an outer circumferential surface of the main body 141 of the cage ring 140.

Figure 8:
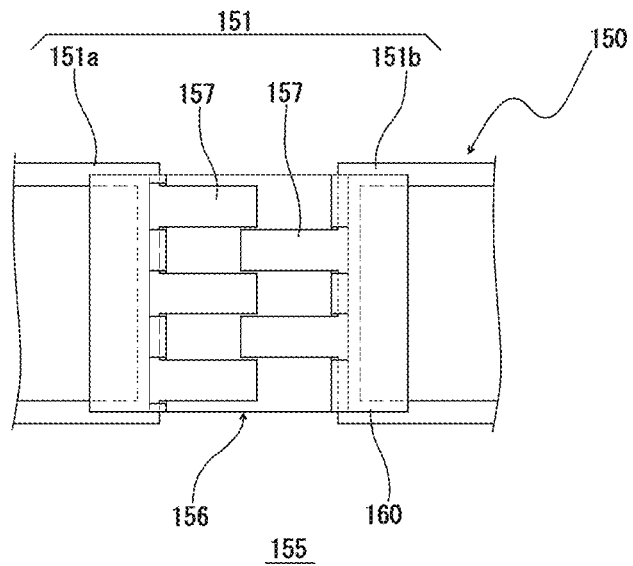
FIG. 8 is a schematic plan view illustrating the end structure shown in FIG. 7.

The end structure 155 according to this embodiment will be described in more specific terms. As shown in FIG. 8, the base part 151 of the biasing means 150 is substantially in a ladder-like form, with engagement portions 157 extending outwardly in the longitudinal direction from both longitudinal ends in a comb-like manner. The resilient member 160 is a U-shaped plate spring, for example, with through holes in each of the movable pieces continuing from both ends of the curved portion, for the engagement portions 157 of the base part 151 to pass through. In this embodiment, the resilient member 160 is disposed in an orientation where the curved portion protrudes radially inward, the curved portion contacting an outer circumferential surface of the cage ring 140 and forming the contact portion 156. The distal ends of the movable pieces are each folded to directions circumferentially away from each other, and secured to the outer circumferential surface of the base part 151. The engagement portions 157 on one end of the base part 151 and the engagement portions 157 on the other end of the base part 151 mesh with each other. The resilient member 160 elastically deforms, allowing both ends of the base part 151 to push each other in the circumferential direction.

Using such an end structure 155 for the biasing means 150 can likewise reduce circumferential and radial elastic deformations of the biasing means 150 and enable the biasing means to maintain its intended shape. Thus displacement at the positions where the cam-biasing portions 153 contact the cams 130, and variations in the biasing force on the cams 130, can be prevented.

While the resilient member 160 described in this embodiment is configured to be able to contact an outer circumferential surface of the cage ring 140, the resilient member may be configured to protrude radially outward and to contact an inner circumferential surface of the outer race 120, for example.

The end structure 155 of the biasing means 150 shown in FIG. 9 is formed by one end 151a and the other end 151b of the base part 151 overlapped in a radial direction. A radially inwardly protruding bent portion 154 is formed between one longitudinal end of the base part 151 and the cam-receiving portion 152 closest to the one end of the base part, with a contact portion 156 continuous with the bent portion 154 making contact with the cage ring 140. The cam-receiving portion 152 closest to the other longitudinal end of the base part 151 has the cam-biasing portion 153 at the edge on one longitudinal end, and a cam-pressing portion 158 configured to be able to contact the constricted part 131 of the cam 130 at the other, circumferentially opposite, edge. The distal end of the cam-pressing portion 158 is shaped in conformity to the constricted part 131 of the cam 130 so as not to inhibit the rotation of the cam 130. The other longitudinal end of the base part 151 is able to contact the bent portion 154 formed at the one longitudinal end of the base part 151.

The biasing means 150 with such an end structure 155 is constrained in the radial direction, with the contact portion 156 contacting the cage ring 140 that is positioned radially outside the biasing means 150, and the cam-pressing portion 158 contacting the constricted part 131 of the cam 130 that is positioned radially inside the biasing means 150. The other end of the base part 151 contacts the bent portion 154 on the one end of the base part 151 so that both ends of the base part 151 can push each other in the circumferential direction. Any circumferential movement of the base part 151 takes place while being radially constrained, so that the shape stability of the biasing means 150 is maintained.

Therefore, using such an end structure 155 for the biasing means 150 can likewise reduce circumferential and radial elastic deformations of the biasing means 150 and enable the biasing means to maintain its intended shape. Thus displacement at the positions where the cam-biasing portions 153 contact the cams 130, and variations in the biasing force on the cams 130, can be prevented.

Reference numeral 170 in FIG. 9 denotes an operating mode switch means adapted to be driven independently from the rotation of the inner race 110 and outer race 120. Needless to say, the biasing means 150 with the end structure 155 shown in FIG. 9 can be incorporated in a cam clutch without such operating mode switch means.

While embodiments of the present invention have been described above in detail, the present invention is not limited to the embodiments described above. Various design changes may be made without departing from the scope of the present invention set forth in the claims.

The present invention can be applied to a selectable clutch configured to be switchable from one operation mode to another. When applied to a selectable clutch, the drive force required to switch operating modes can be reduced, so that the size and cost of the switch driving mechanism can be reduced. The ability to load all the cams in a uniform orientation makes it easier to design selectable clutches and other variations that require cam orientation control.

What is claimed is:

1. A cam clutch comprising:
   an inner race and an outer race coaxially disposed and rotatable relative to each other;
   a plurality of cams arranged between the inner race and the outer race;
   a cage ring holding the cams in a circumferential direction; and
   a biasing means biasing the cams to make contact with the inner race and the outer race,
   the biasing means being a ribbon spring including a base part shaped into a ring and having cam-receiving portions and cam-biasing portions that bias the cams fitted in the cam-receiving portions,
   the biasing means having an end structure configured to allow both ends of the base part to push each other in a circumferential direction, and
   the end structure including a contact portion that extends in a radial direction and makes surface-contact with any of the inner race, the outer race, and the cage ring.

2. The cam clutch according to claim 1, further comprising bent portions protruding radially outward or inward at both edges that define the cam-receiving portions of the base part, and axially adjacent to the cam-biasing portions.

3. The cam clutch according to claim 2, wherein the bent portions are formed so as to be able to contact any of the inner race, the outer race, and the cage ring.

4. The cam clutch according to claim 1, wherein
longitudinal ends of the base part are bent in a same radial direction, with respective distal ends thereof being curved in a circular arc, and
the contact portion is formed, with the ends of the base part being configured to abut each other in a circumferential direction.

5. The cam clutch according to claim 1, wherein the both ends of the base part are coupled together by a resilient member that protrudes radially outward or inward, and the contact portion is formed by the resilient member.

6. The cam clutch according to claim 1, wherein the biasing means is shaped into a ring by having the both ends of the base part overlapped in a radial direction,
the base part includes a radially outwardly or inwardly protruding bent portion between one longitudinal end and a cam-receiving portion closest to the one longitudinal end, with a contact portion that is continuous with the bent portion making contact with any of the inner race, the outer race, and the cage ring, and
another longitudinal end of the base part is configured to be able to contact the bent portion.

\* \* \* \* \*